G. G. PASSARO.
EEL TRAP.
APPLICATION FILED MAR. 16, 1909.
943,842.
Patented Dec. 21, 1909.
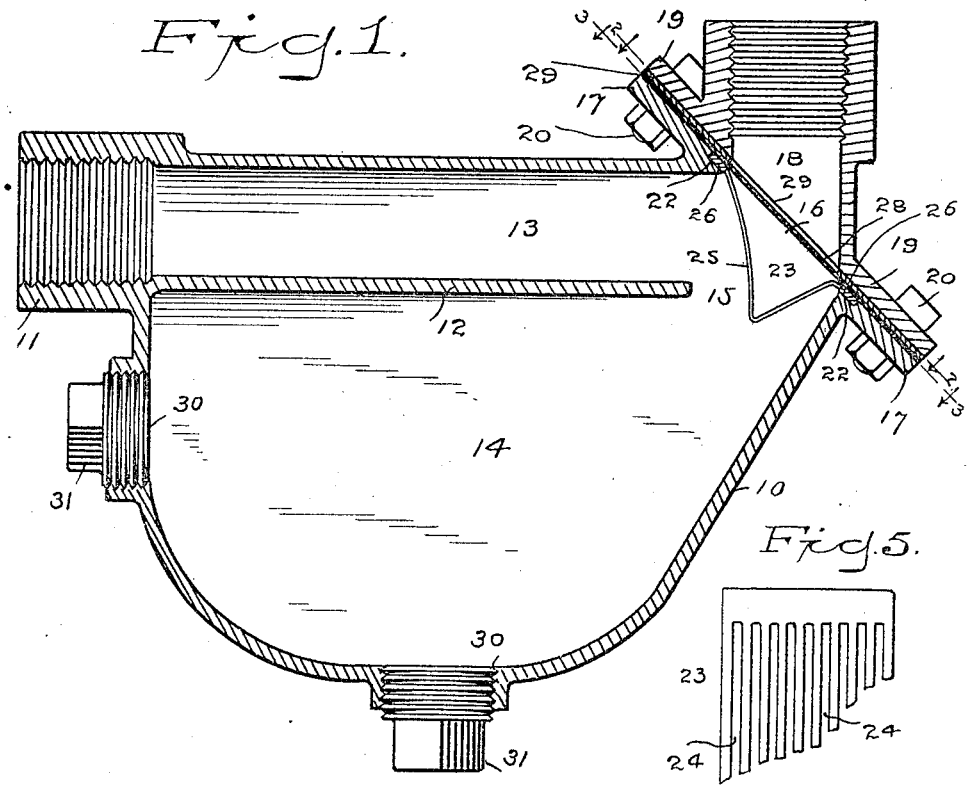
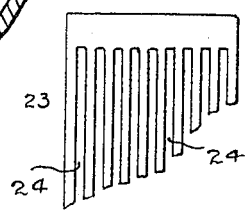
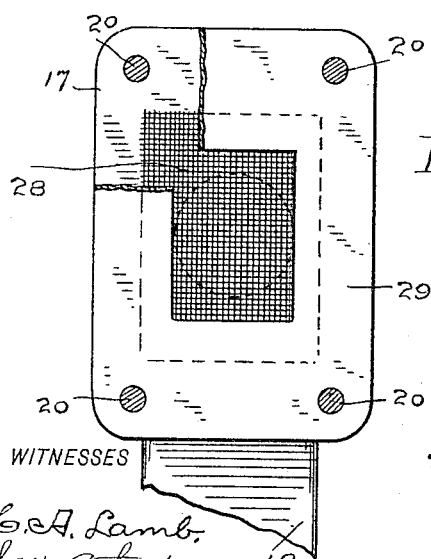
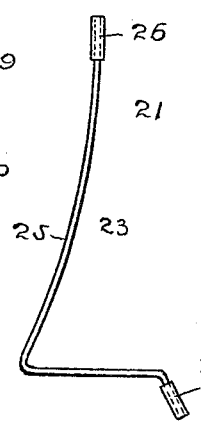
WITNESSES
H. A. Lamb.
S. W. Atherton.
INVENTOR
Gennaro G. Passaro
BY
A. M. Wooster
ATTORNEY

UNITED STATES PATENT OFFICE.

GENNARO G. PASSARO, OF STAMFORD, CONNECTICUT.

EEL-TRAP.

943,842.

Specification of Letters Patent. Patented Dec. 21, 1909.

Application filed March 16, 1909. Serial No. 483,722.

*To all whom it may concern:*

Be it known that I, GENNARO G. PASSARO, a citizen of the United States, residing at Stamford, county of Fairfield, State of Connecticut, have invented a new and useful Eel-Trap, of which the following is a specification.

This invention has for its object to provide a simple, inexpensive and easily cleaned trap adapted to be placed wherever required in water pipes, as where a service pipe from a water main enters a building, which will effectually prevent the passage of eels and fish and solid animal and vegetable matter generally, and will provide a pocket to receive all accumulations of solid matter from which such matter may be readily removed.

With these and other objects in view I have devised the novel structure which I will now describe, referring to the accompanying drawing forming a part of this specification in which reference characters are used to indicate the several parts.

Figure 1 is a longitudinal section of my novel trap complete; Fig. 2 a detail sectional view on the line 2—2 in Fig. 1 looking in the direction of the arrows, a portion of the gasket being broken away; Fig. 3 a similar section on the line 3—3 in Fig. 1, looking in the direction of the arrows; Fig. 4 an end elevation of one form of guard detached; and Fig. 5 is a detail front elevation of a variant form of guard.

10 indicates the body of my novel trap which is cast in a single piece, thus reducing the cost of production to the minimum. 11 indicates a hub, shown as internally threaded, to which the incoming water pipe (not shown) is attached and 12 a wall which separates a water passage 13 from the pocket 14 below it. The passage is continuous with the incoming water pipe and extends three-fourths, more or less, across the body leaving an eel passage 15 at its end down into the pocket. At the end of the body opposite to incoming hub 11 is an outgoing water opening 16 which is surrounded by a flange 17, preferably lying at an angle of forty-five degrees, more or less, to the plane of passage 13.

18 indicates a hub, shown as internally threaded, to which the outgoing water pipe (not shown) is attached. This hub is provided with a flange 19, lying in the plane of flange 17, to which it is attached by bolts 20.

The escape of eels and fish and the passage of any solid animal or vegetable matter from the trap is prevented by means of a guard 23 which projects from the plane of the flanges toward, and preferably below, the end of wall 12, and the ends of which are shown as seated in recesses 22 on opposite sides of opening 16. This guard is so constructed as not to interfere to any appreciable extent with the passage of water. Its action is to deflect eels, fish and any solid matter that may enter the trap through the incoming water pipe and cause such matter to pass downward into the pocket where it will remain. The special construction of the guard is not of the essence of the invention, the essential feature being that it be so shaped that it will deflect eels, fish, etc. down into the pocket and have an angular formation that will prevent them from returning above the plane of the wall 12. I preferably use the angular form of guard illustrated as I have found it completely effective in use. The guard has an upper portion which extends down in a substantially vertical direction to a point opposite or a little below the end of wall 12, and a lower portion at an angle thereto and extending in a direction inclined relatively to the inclined wall of the pocket. The upper portion will deflect an eel downward into the pocket 14 from which it is not likely to get back into the passage 13 because the inclined wall of the pocket will direct it up under the lower inclined portion of the guard and the latter directs it back into the pocket. The guard may be formed from sheet metal, as in Fig. 5, and provided with openings 24 which may be either slots or holes, or it may be made from pieces of wire, indicated by 25, as in Figs. 1, 3 and 4, the ends of the pieces being spaced and secured together in any suitable manner as by U-shaped strips 26 of metal clamped over the end and soldered thereto.

In assembling, the ends of the guard are placed in the recesses to receive them with the projecting portion extending inward. Over the guard I preferably place a screen 28 of wire netting which stops smaller particles of animal and vegetable matter and permits such matter to drop down through the guard into the pocket. Between the flanges 17 and 19 I place a gasket 29 in order to insure a water-tight joint. The pocket is provided with an opening or openings 30 shown as closed by screw plugs 31 for the purpose of permitting the convenient removal of eels, fish and any solid animal or vegetable matter that may accumulate therein. Any suitable valves or cocks may be used if preferred.

The operation will be obvious from the drawing. If the water is free from eels, fish and all solid animal and vegetable matter, the trap will require no attention whatever. Should any eels or fish enter the trap from the incoming water pipe they will strike the guard and be deflected downward into the pocket. Should they attempt to pass into the outgoing water pipe they will be effectually stopped by the guard and retained in the pocket. Should the passage of water through the trap become clogged or impeded, one or both of the screw plugs may be removed and the water allowed to pass through the pocket which will quickly carry out any eels, fish or other matter that may have accumulated therein. Should the guard or screen become clogged, the bolts may be removed and the flanges separated, which would permit the screen and the guard to be conveniently removed for cleaning and as readily replaced. The screen may be dispensed with if preferred. When water is known to be infested with eels or fish, the pocket should be opened frequently and allowed to clear itself without waiting for the trap to become clogged.

Having thus described my invention I claim:

1. An eel trap comprising a body having incoming and outgoing pipe connections, a wall extending from the incoming connection but leaving a passage at the end thereof, a pocket below the wall into which the passage opens and a guard acting to deflect eels and other solid matter into the pocket and to prevent the passage of eels and other solid matter from the trap, said guard having one portion opposite the end of the incoming passage and another portion at an angle thereto and inclined relatively to the wall of the pocket.

2. An eel trap comprising a body having incoming and outgoing pipe connections, a wall extending from the incoming connection and forming a water passage across the body, a pocket below the wall, a passage leading from the water passage into the pocket and a guard acting to deflect eels and other solid matter into the pocket and to prevent the passage of eels and other solid matter from the trap, said guard having one portion opposite the end of the incoming passage and another portion at an angle thereto and inclined relatively to the wall of the pocket.

3. An eel trap comprising a body having incoming and outgoing pipe connections, a wall extending from the incoming connection but leaving a passage at the other end thereof, a pocket below the wall into which the passage opens and a guard consisting of parallel wires connected at the ends, said wires being bent intermediate their ends to form two portions at an angle to each other, substantially as described, for the purpose specified.

4. An eel trap comprising a body having an incoming water connection and a water passage leading therefrom, a pocket below the water passage, a passage leading from the water passage into the pocket, an outgoing water opening surrounded by a flange lying at an angle to the plane of the water passage, an outgoing water connection having a flange corresponding with the flange on the body, means for securing the flanges together and a guard held between the flanges, said guard having one portion opposite the end of the incoming passage and another portion at an angle thereto and inclined relatively to the wall of the pocket.

5. An eel trap comprising a body having an incoming water passage, below said passage a pocket, a passage leading from the water passage into the pocket, an outgoing water opening surrounded by a flange having opposite recesses, a guard comprising wires lying parallel and secured together, the ends lying in the recesses and an outgoing water connection having a flange secured to the flange on the body and retaining the guard in place.

6. An eel trap having incoming and outgoing water connections at an angle to each other, a transverse wall forming a water passage continuous with the incoming opening, and below said wall a pocket said pocket having an inclined side below the outgoing passage, a passage leading into the pocket and a guard acting to deflect eels and other solid matter into the pocket and to prevent escape of eels and other solid matter from the trap, said guard having two portions at an angle to each other, one portion of the guard being inclined relatively to the inclined side of the pocket.

In testimony whereof I affix my signature, in presence of two witnesses.

GENNARO G. PASSARO.

Witnesses:
 FLOYD B. BARTRAM,
 C. POND WEBB.